Feb. 7, 1950        A. L. OCHELTREE        2,496,635
VALVE CONSTRUCTION AND CONTROL
Filed Feb. 9, 1944                                              3 Sheets-Sheet 1
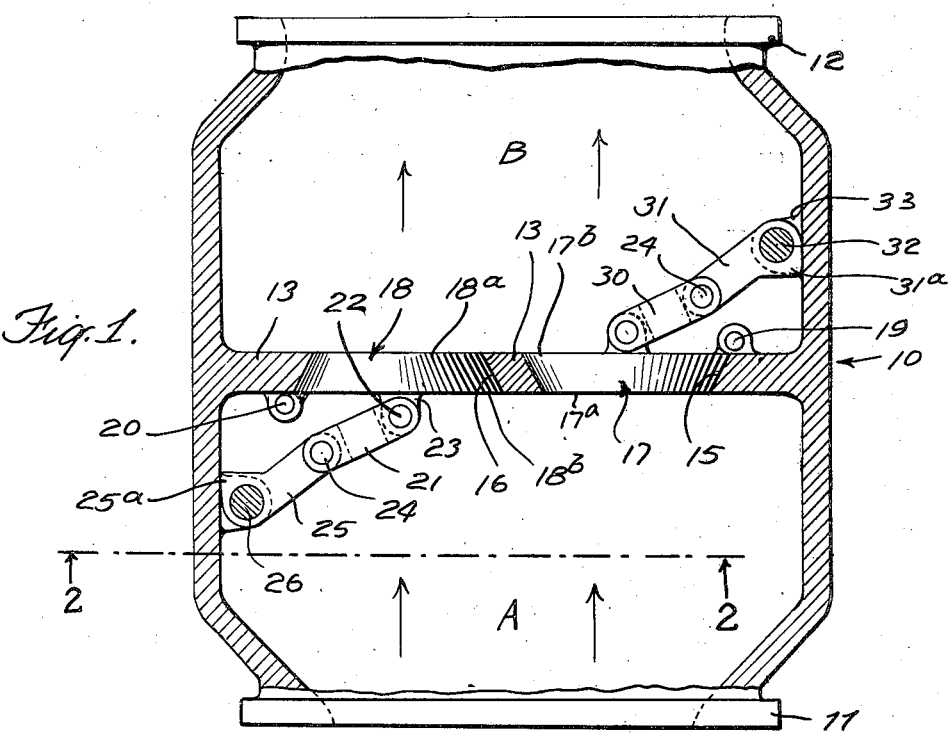
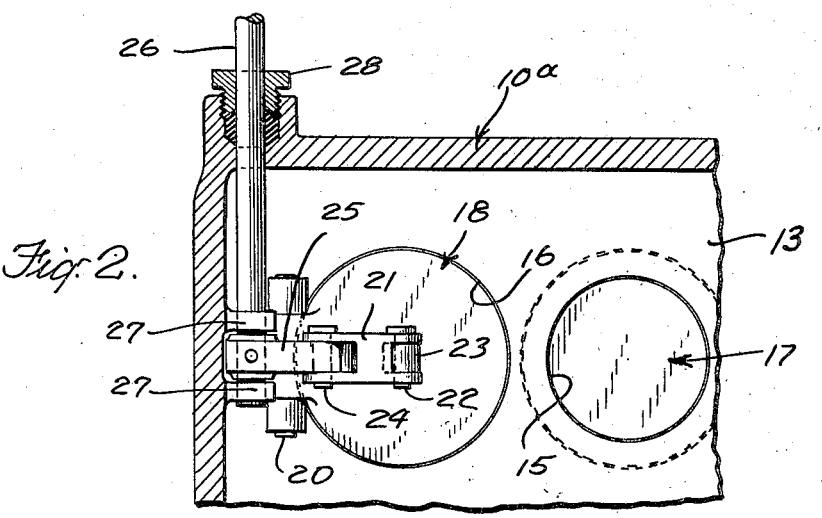
INVENTOR
ARTHUR L. OCHELTREE
BY
William T. Kresser
ATTORNEY

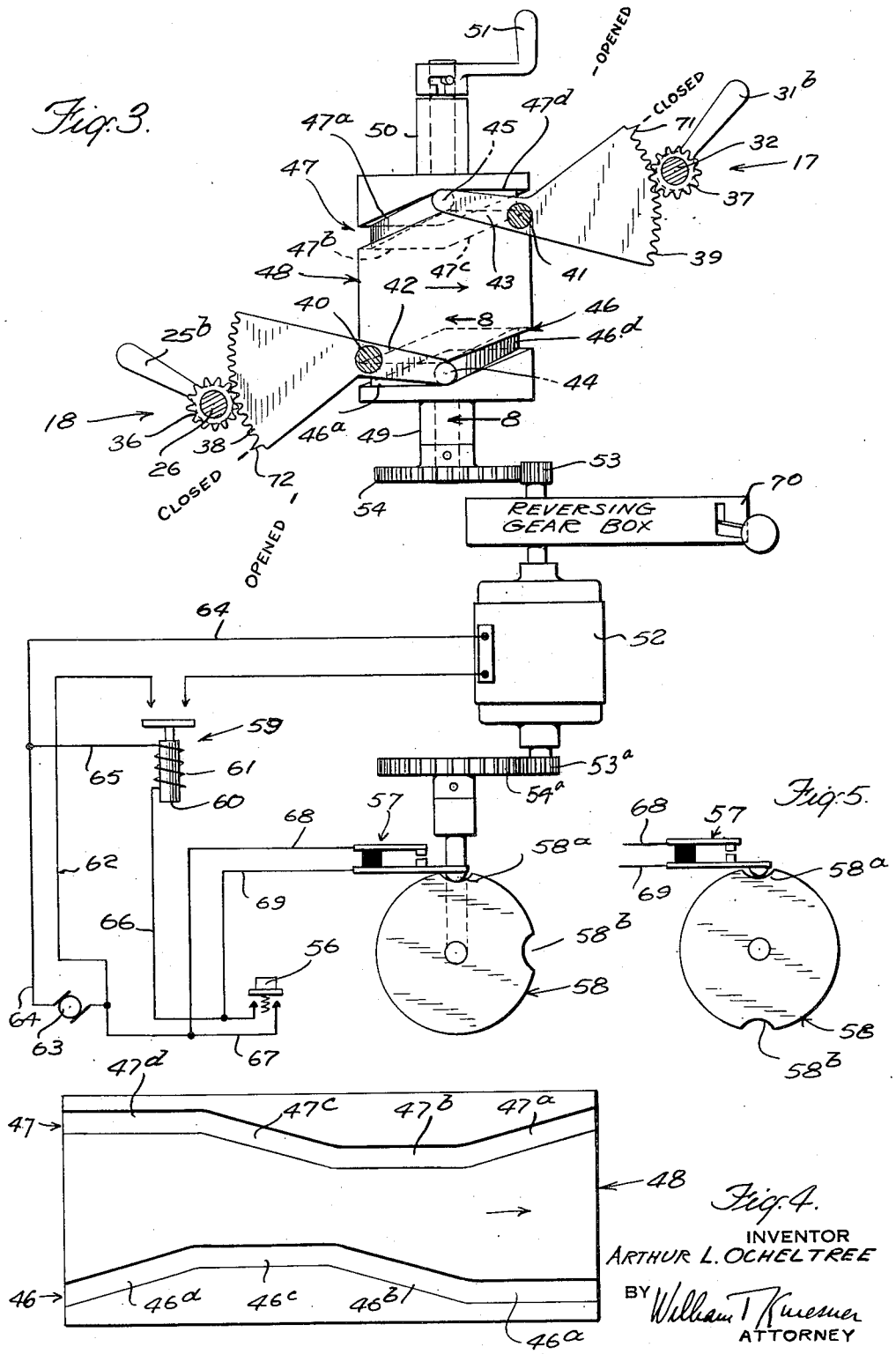

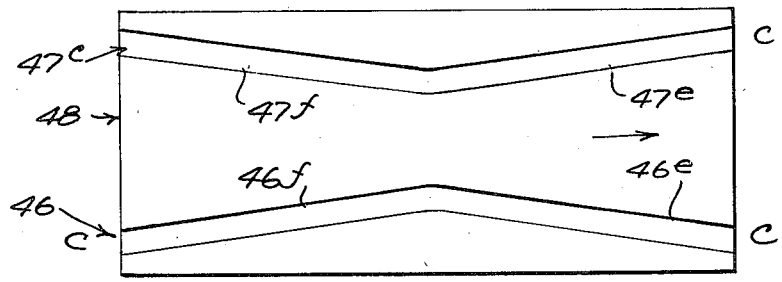
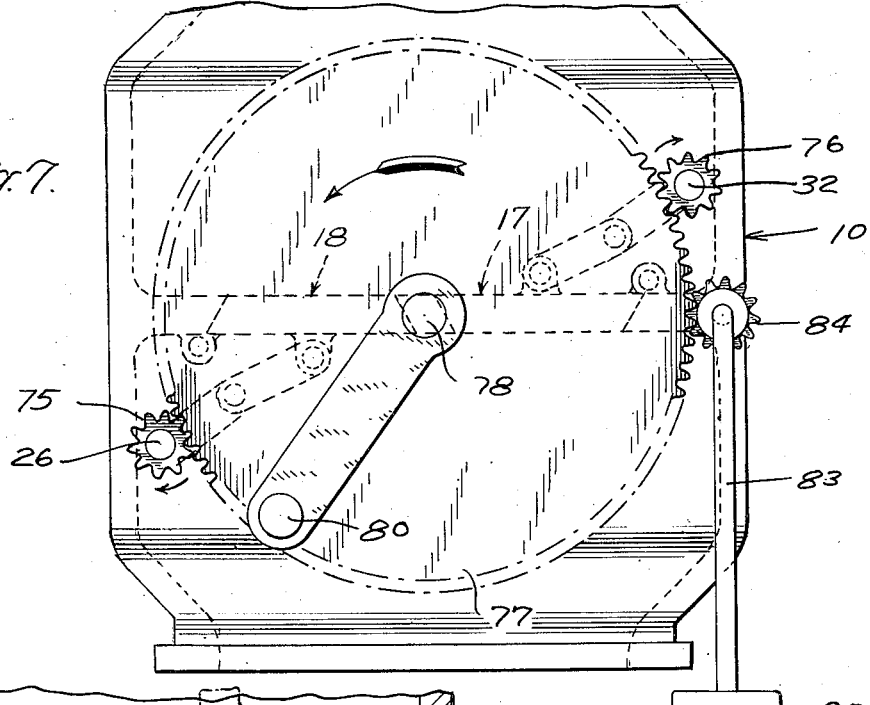
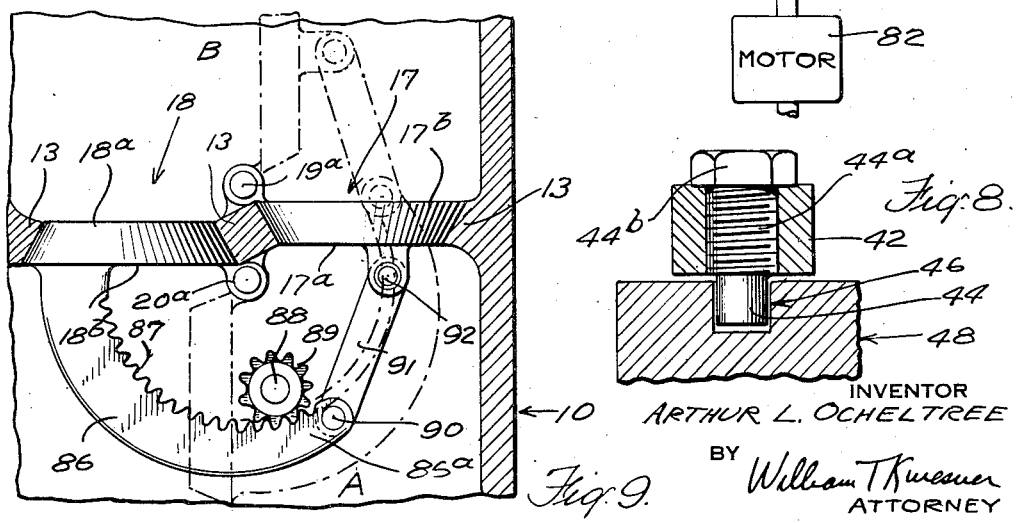

Patented Feb. 7, 1950

2,496,635

UNITED STATES PATENT OFFICE 2,496,635

VALVE CONSTRUCTION AND CONTROL

Arthur L. Ocheltree, New York, N. Y.

Application February 9, 1944, Serial No. 521,612

12 Claims. (Cl. 137—144)

This invention relates to valve construction and control, particularly to valve constructions for use in hydraulic or liquid pipe lines and the like.

One of the objects of this invention is to provide a simple, practical and inexpensive valve construction and control that will be of dependable and reliable action in use. Another object is to provide a valve construction and control capable of use in conduits, pipe lines or the like and capable of operating to handle substantial pressures or heads but in a way to make for less expensive construction and greater ease of operation, either manual or by power. Another object is to provide a valve construction and actuating mechanism or control that will achieve simple and dependable locking of the valve or valves particularly in closed position. Another object is to provide a valve construction of the above-mentioned character that may be power-actuated as by an electric motor and which will require less actuating or driving energy even though operating against substantial pressures or heads. Another object is to provide a valve construction and actuating mechanism therefor that will provide simple, inexpensive and powerful means for both actuating and locking or unlocking the valve. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown several of the possible embodiments of my invention, Figure 1 is a horizontal sectional view of a valve unit illustratively of the flanged type, showing an illustrative internal arrangement of valve and valve locking and actuating mechanisms according to my invention;

Figure 2 is a fragmentary vertical sectional view as seen along the line 2—2 of Figure 1 to illustrative a possible mode of mounting and construction to effect actuation from the exterior of the valve unit or casing;

Figure 3 is a plan view of the construction showing largely diagrammatically certain of the actuating mechanisms and the controls therefor;

Figure 4 is a development of an actuating and control cam of the mechanism of Figure 3;

Figure 5 is a fragmentary view like that of Figure 3, but showing only a modified form of cam;

Figure 6 is a development of another form of valve-operating cam;

Figure 7 is a plan view of a modified form of valve unit;

Figure 8 is a detached enlarged section on line 8—8 of Figure 3, and

Figure 9 is a horizontal sectional view of another form of valve mechanism.

Similar reference characters refer to similar parts throughout the several views of the drawing.

Referring first to Figure 1, the valve unit may comprise a casing 10 of any suitable configuration and illustratively provided with two suitable means such as the flanges 11 and 12 by which the structure may be connected into a pipe line or wherever it is intended to be employed, the flanges being, of course, annular and surrounding what may be termed inlet and outlet openings or passageways and leading, respectively, to chambers A and B within the casing 10, the two chambers being formed by a substantially central and transversely extending wall 13. The parts 10, 11, 12, 13 may be cast or otherwise formed if desired as a single piece, thus to be integral throughout.

In the dividing wall 13 I provide two valve ports 15 and 16 of any suitable configuration or shape and each being preferably of an area at least as great as the cross-section of the inlet or outlet passageways and hence of the pipe line itself, so that each port may independently of the other adequately handle or carry the volume of flow and at the intended rate.

The ports 15 and 16 are bevelled or tapered as indicated in Figure 1 to form, about their respective peripheries, continuous bevelled seats to receive, respectively, the valve members 17 and 18 which are preferably likewise bevelled to conform to the seats and thus in effect to permit each to be practically wedged into its port to tightly close and seal it. The valve members 17 and 18 are securely hinged by any suitable hinge constructions indicated at 19 and 20 for the valve members 17 and 18, respectively.

As shown in Figure 1, the bevelling of the two seats of ports 15 and 16 is effected from opposite sides of the transverse wall 13 and hence the hinge mountings 19 and 20 are likewise upon opposite sides of the central wall 13. With this preferred arrangement valve 17 has to swing clockwise to uncover the port 15 and valve 18 has to swing counterclockwise about its hinge pivot 20 to open the port 16.

For each valve 17 and 18 I provide preferably not only actuating mechanism but also locking or securing means to lock or secure each valve in closed position so as to relieve the external driving mechanism from strain or stress that might be exerted on it when the valves are closed, and preferably and conveniently I combine such locking and actuating means into one and the same mechanism.

Thus, for example, for valve 18 I provide a combined locking and actuating mechanism in the form of a toggle linkage which, as shown in Figures 1 and 2, preferably comprises a link 21 pivoted as by pin 22 to a strong and heavy ear or lug 23 on the hinged valve 18. Link 21 is in turn pivotally connected as by pin 24 to a link or arm 25 which is keyed or secured to a vertically-extending shaft 26 that has lower bearings in the form of spaced lugs 27—27 integrally formed interiorly of the valve casing 10 and between which the hub portion of arm 25 is accommodated; the shaft 26 extends upwardly through the top wall 10a (Figure 2) of the casing 10, being provided with any suitable bearing means in the wall 10a and also with any suitable sealing means such as a stuffing box 28, whence the shaft 26 may be given rotary movement from the exterior of casing 10.

As shown in Figure 1, the linkages 21—25 are extended to straight-line position or preferably somewhat and just slightly beyond straight-line relation of the three pivots 26, 24 and 22, being so proportioned that in these relative positions, the valve 18 is closed and tightly seated against the bevelled seat of port 16.

If the shaft 26 is given a rotary movement of about 90° or so in clockwise direction as viewed in Figure 1, the above self-locking relationships of the links 21 and 25 is broken and the valve member 18 swings clockwise about its hinge 20 and into open position.

It will be noted that, with valve 18 closed, if the pressure is higher in chamber A than in chamber B, the pressure differential aids in holding valve 18 seated in closing position. If the pressure in chamber B is higher than in chamber A when the valve 18 is closed, the above-described self-locking relationship of the toggle links 21 and 25 opposes the pressure differential and dependently holds the valve 18 in closed position. Preferably, in this latter relationship of the links 21 and 25, the preferred arrangement being such that pivot 24 is slightly beyond (in counterclockwise direction) the dead center or straight-line relationship of the pivots, I provide a stop to limit link 25 against further counterclockwise movement, and such a stop may comprise an enlargement 25a formed integrally with the link or arm 25 and so dimensioned as to just engage the inside of the wall of casing 10 at the point of self-locking of the linkage.

In similar manner, valve 17 is provided with links 30 and 31, the former being pivotally connected to valve 17 and the latter being keyed or secured to a vertical shaft 32 rotatably supported in lugs or ears 33 at its lower end and extending upwardly through a suitable bearing and stuffing box construction in the wall 10a, like the shaft 26 of valve 18, so that both may thus be operated from the exterior of casing 10. In Figure 1 the stop lug on toggle arm 31, to limit counterclockwise swing of arm 31 too far in the self-locking position is indicated at 31a for engagement with the side wall of the casing 10.

Referring now to Figure 3, the shafts 26 and 32 are provided with spur gears 36 and 37, respectively, to mesh with gear sectors 38 and 39, respectively, that are preferably of greater radius than the spur gears; with the illustrative operating mechanism, I prefer such a gear ratio in order that the gear sectors need partake of a smaller angle of rotary movement and thus also to give the shafts that control the valves a multiplied or increased rotary movement. Thus, if each shaft requires a turn of about 120° to swing its valve from open to closed position or vice versa, the gear ratios just mentioned may be such that only a 20° turn of the gear sectors is necessary.

Gear sectors 38 and 39 are pivotally mounted on studs 40 and 41 in turn mounted in the top wall 10a of the casing 10 and they have secured to them lever arms 42 and 43 that extend toward each other, but are displaced as indicated in Figure 3. At their free ends these arms have studs 44 and 45 provided, respectively, with rollers that extend into cam grooves 46 and 47 of a cylindrical cam 48 mounted in suitable bearings 49—50 carried by the top wall 10a, for rotation about a horizontal axis.

The drum cam 48 may be driven in any suitable way and at a suitable rate, for example, as by a hand crank 51 or any suitable source of motive power such as an electric motor 52, any suitable driving connection being provided such as gearing 53—54.

The cam grooves 46 and 47, shown in development in Figure 4, are shaped and related to each other to bring about actuation of the valves 17 and 18 in sequences or sequential steps and, illustratively, each cam groove has four portions 47a, 47b, 47c and 47d for cam groove 47, and 46a, 46b, 46c and 46d, for cam groove 46. For facility of description these portions may be assumed to be of the same angular extent, each subtending a 90° angle of the cam drum 48.

With both valves 17 and 18 locked in closed position as shown in Figure 1, the operating mechanism assumes relative positions of its parts as shown in Figure 3, cam follower 45 for valve 17 being just at the beginning of cam groove portion 47a and cam follower 44 being just at the beginning of cam groove portion 46a.

For purposes of illustration, let it be assumed that the high pressure side of the valve is chamber A in Figure 1 and that it is against that pressure that the valve opening is to be effected. The cam drum 48 is started in rotation at a suitable speed, preferably relatively slow, and during the first quarter turn (the surface of the cam drum moving in the direction of the arrow shown in Figure 3) cam portion 46a holds cam lever 42 and hence valve 18 closed, being aided by the pressure in chamber A, which helps to seat the valve 18 in its port 16; during that same quarter turn, cam portion 47a is traversed relative to cam follower 45 thus swinging gear sector 39 counterclockwise and through gear 37 rotating valve shaft 32 (Figures 3 and 1) in counterclockwise direction sufficiently to unlock the locked toggle 30—31 and to swing the valve 17 open, being aided by the pressure in chamber A. The resultant valve opening, namely, port 15 is sufficient to to take care of the volume and rate of flow, in the preferred form.

The ensuing quarter turn of drum cam 48 rides the cam portion 47b along the cam follower 45, holding the latter and lever 43 motionless and hence holding opened valve 17 in its open position, but while that is happening cam portion 46ᵇ is traversed relative to the cam follower 44 to swing cam arm 42 and hence gear sector 38 in counterclockwise direction and thus to rotate shaft 26 of valve 18 in clockwise direction to unlock the locked toggle linkage and move the valve 18 into completely opened position, and here it is to be noted that there is no pressure differential opposing the opening movement of valve 18 because the previous opening of valve 17 has equalized the pressure in chambers A and B and hence little power has to be exerted to open valve 18.

The next quarter turn of cam drum 48 traverses cam portions 46ᶜ and 47ᶜ relative to the cam followers 44 and 45, respectively, holding valve 18 open but effecting closure of valve 17 since the cam portion 47ᶜ swings lever 43 in clockwise direction and through the gearing 39—37 rotates valve shaft 32 in counterclockwise direction to swing valve 17 closed and against its seat, the toggle linkage 30—31 assuming a locking position. Here it will be noted that the closure of valve 17 is easily effected since it does not operate against any pressure differential, valve 18 remaining open during the movement of valve 17 to closed position.

In this relationship of the parts, with the cam drum 48 thus given a three-quarters turn, the valve unit is in open condition and flow takes place in the direction from chamber A to chamber B.

If, now, it is desired to shut off this flow and thus close the valve, cam drum 48 is given the final quarter turn, thus to traverse cam groove portions 46ᵈ and 47ᵈ relative to the cam followers 44 and 45, respectively. Cam portion 47ᵈ does not during this last quarter turn actuate the lever, but holds it steady, thus leaving valve 17 closed and locked. But cam portion 46ᵈ swings cam arm 42 in clockwise direction and through gearing 38—36 rotates valve shaft 26 in counterclockwise direction to swing the valve 18 into seating and closing relation to its port 16, it being noted that in this movement the pressure and flow from chamber A to chamber B through the port 16 are in a direction to aid the closing movement of valve 18, the pressure in chamber A finally aiding the locked toggle 25—21 in holding the valve 18 closed or in its final position.

If for any reason the valve is to be operated to control flow in reverse direction, that is, from chamber B to chamber A, the drum 48, from the position shown in Figure 3, is simply rotated in reversed direction, being given initially a three-quarters turn to open the valve structure and a final one-quarter turn to close it, the mechanism above described being wholly reversible in that respect.

The apparatus lends itself to remote control as when driven by motor 52 and, by way of illustration, I have indicated a push button switch 56 in Figure 3 connected in circuit with motor 52 to start it, and also a holding switch 57 controlled by a cam 58 driven by suitable gearing from the motor 52 so that it runs synchronously or in step with the cam 48. Cam 58 is of such a radius that it holds switch 57 closed excepting at two points 58ᵃ and 58ᵇ where the cam periphery has two depressions into which one of the spring arms of holding switch 57 rides selectively according to which depression is brought to the switch 57. Starting switch 56 and holding switch 57 could be connected directly into the power circuit of motor 52, but preferably are connected to control a relay switch 59 which is normally biased, as by the weight of its moving parts including the core 60 of the solenoid winding 61, into circuit-opening position, the switch 59 being connected in the power line 62 leading from any suitable source of electrical energy indicated at 63 to the motor 52, the circuit being completed by the power line 64. Winding 61 is connected to one side of the circuit as by conductor 65, its other terminal being connected by conductor 66 to one side of the start switch 56, the other side of the latter being connected by conductor 67 to the other power line 62. Conductors 68 and 69 connect the holding switch 57 in parallel with the start switch 56.

Cam depression 58 is in line with the coincident starting points of cam groove portions 46ᵃ and 47ᵃ and hence with both valves closed, holding switch 57 is open as is also the push button switch 56 and hence winding 61 is de-energized and main switch 59 is open. To start the motor 52 to open the valve, push button 56 is depressed whence winding 61 is energized to close main switch 59 and hence motor 52 starts as does also the cam 48 and the cam 58, the latter lifting the spring arm of holding switch 57 into closing position and thereafter holding the switch closed, the lifting being completed during such short interval of time as the push button switch 56 is held depressed upon starting. Hence main switch 59 remains closed.

The motor 52 thus continues to run even if start switch 56 is released and thus the cam drum 48 is slowly driven for the first three-quarters of a turn as initially above described to put the valves 17 and 18 through the sequences above described, and to condition the valve structure for flow of fluid from chamber A to chamber B, for the motor 52 is stopped at the end of that three-quarters turn because the cam depression 58ᵇ causes the switch 57 to open, thus to de-energize main switch winding 61 to open switch 59, stopping the motor.

If it is desired to close the valve structure to stop the flow from A to B in Figure 1, the start switch 56 is again depressed to energize and close main switch 59, cam drum 48 switch cam 58 commence to rotate, the latter riding its depression 58ᵇ away from the holding switch 57 and thereby closing the latter to keep the main switch winding 61 energized and the motor circuit closed. The motor continues to drive the cams for the remaining one-quarter of a turn, shutting off the flow in the valve unit in the manner above described, and at the end of that quarter turn cam depression 58ᵃ opens the holding switch 57 to stop the motor.

Switch cam 58 and drum cam 48, in the above described illustrative form, thus make a single revolution each to complete an entire cycle of operations of the valve unit. For this purpose the ratio of drive of the gears 53—54 that drive the drum cam 48 from the motor 52 and the ratio of drive of the gears 68—69 are the same, and these two cams are preferably driven by such separate gear trains as those just mentioned in order, when desired, the drive of the drum cam 48 may be reversed without reversing the drive of the switch cam 58. Thus, if it is desired to reverse the cycle, as when the flow to be controlled is from chamber B to chamber A, the direction of rotation of the cam drum 48 is reversed and this may be effected by a manually controlled reverse gear diagramatically indicated in Figure 3 at 70; the reverse gear is interposed between the two above-mentioned gear trains 53—54 and 68—69 and hence its operation affects only the drive of the drum cam 58, whereby the drive of the cam 48 is reversed without reversing the drive of the switch cam 58.

It will be seen that the actuation of the valve construction involves sequences of steps of operating of which preferred or illustrative cycles of steps have been above set forth and it will be understood that many of the advantages of my invention may be achieved by variations or modifications in such sequences or cycles; for example, where a cam drive is employed, such as cam drum 48, the different companion cam portions need not all subtend the same angle so that each of the successive steps requires the same time element, equal time elements having been selected in the above description to simplify the latter and as conducive to a quicker understanding of the broader features of my invention. By way of further example, of a variation of the cycles or sequences, it will now be seen and better appreciated that, for flow in the direction, for example, from chamber A to chamber B, the sequence may comprise: unlock valve 17 and move it to open position, thus aided by the pressure in chamber A, and then unlock and open valve 18, now unopposed because the pressures in chambers A and B are equal; the two valves may be left open so that both ports function during flow, an arrangement that permits making each valve and its port of substantially only one-half of the intended capacity, and in such case the shut-off steps of the cycle comprise moving valve 17 closed and locking it, being not materially opposed because the pressure in the two chambers A and B are substantially equal, and then moving valve 18 and locking it in closed position, that movement being aided by the pressure and flow in a direction from chamber A to chamber B. In such case, a half revolution of the drum cam 48 opens the valve structure for flow and the succeeding half revolution shuts off the flow, whence, as is now clear, the cam parts 58ª and 58ᵇ of the switch cam 58 are 180° apart, as shown in Figure 5, making the action of the cam on the holding switch 57 the same regardless of its direction of rotation so that therefore the reverse gear 70 can be omitted and the apparatus thereby further simplified. It will be understood, therefore, that the step of closing that valve member during the time when the other valve member is open may be included in either that portion of the cycle to effect valve-opening or flow of fluid or in that portion of the cycle that effects shut-off and the claims are therefore to be understood and interpreted as optional in these respects.

My invention will thus be seen to have wide range of flexibility of arrangement and operation and, by way of further example, it may be noted that the steps themselves that make up the cycles of valve movements may be changed or varied, as by appropriately changing the shape of the cam grooves 47 and 48. An illustrative change of this character is shown in Figure 6 which is a development of the cam 48 and shows the two cam grooves 46 and 47, respectively, with cam portion 46ᵉ—46ᶠ and 47ᵉ—47ᶠ arranged substantially as shown.

Such a cam groove arrangement effects cyclic valve movements as follows: with both valves 17 and 18 closed and utilizing the cam of Figure 5, starting the rotation of the cam drum 48 (cam followers 45 and 44 being at the beginning or right-hand end of the cam grooves in Figure 6), cam portions 46ᵉ and 47ᵉ progressively operate the shafts 26 and 32, respectively, in directions to open both valves and by the time a half-revolution of the cam drum 48 has taken place, the switch cam 58 of Figure 5 opens the motor circuit and halts the drive of cam drum 48, the cam followers being at the left-hand ends of cam portions 46ᵉ and 47ᵉ, thus leaving both valves open for flow.

A succeeding half revolution of cam drum 48 brings cam grooves 46ᶠ and 47ᶠ into action and both valves are concurrently and progressively brought into closing position.

Also, it is within the contemplation of my invention that, in effecting manual operation of the valve construction, the two valve members 17 and 18 may be put through appropriate sequences of positions or movements, such as those illustratively above described, without having the two valve members or their operating shafts 32 and 26, respectively, tied together mechanically as through the cam drum 48, but that each may be manually operated independently of the other and the desired sequences thus achieved manually. For this purpose any suitable manual means may be utilized to set the valve shafts 32 and 26 into their respective and desired sequences of rotary positions and in Figure 3 the levers 43 and 42 may be considered as appropriate manually-operable handles for such manual sequential operation of the two valves, or the shafts 26 and 32 may be provided with handles 25ᵇ and 31ᵇ as is better shown in Figure 3, whereby they may be directly rotated manually independently of each other, the cam drum 48 and related parts being for that purpose simply omitted, or disconnected, as by withdrawing the cam-follower studs 44 and 45 from coacting relation with the cam grooves. For this purpose, they may be threadedly mounted, as shown in Figure 8. Accordingly, by simply rotating the cam follower by means of the wrench it can be backed off and brought out of the cam groove. In Figure 8 cam follower 44 (and cam follower 45 will be understood to be similarly constructed) is in the form of a stud having a threaded shank 44ª threaded onto the arm 42 and provided with a hexagonal head 44ᵇ which, when in engagement with the upper face of the arm 44, locks the stud in its lowermost and cam-engaging position; by applying a wrench, the cam follower may be unthreaded to a sufficient height to bring the follower stud 44 out of the cam groove.

And to facilitate such manual actuation, and to indicate the sequences when mechanical actuation by the cam drum 48 is utilized, these levers 43 and 42, may be provided with pointers 71 and 72, respectively, as by mounting the latter on the gear sectors 39 and 38, respectively, for coaction with suitable legends, such as the legends "open" and "closed" position, substantially as shown in Figure 3. And should the valve shafts 26 and 32 be manually actuated by their handles 25ᵇ and 31ᵇ, the geared connections 36—38 and 37—38 insure that the pointers just described respond, for proper coaction with the indicating legends, to the positions given the handles 25ᵇ and 31ᵇ. Thus at any time, the setting of the two valves is indicated and by way of illustration, the just-described arrangement shows that both valves are closed, that being the starting position selected for illustration in the drawing and to facilitate description.

I am also enabled to achieve other advantages due to the pressure differentials available in the pipe line, that is, in chambers A and B of Figure 1. In that figure and as earlier above described, the valve seats and valve members are bevelled or tapered and, illustratively, I prefer to make this tapered effect substantial and hence preferably use substantial thicknesses for both the valve members and the wall 13 in which the seats of the ports 15 and 16 are formed, in order thereby to present valve-faces of materially different areas to each of the chambers A and B where the valve is to function reversibly. Thus, in valve member 17, the area of face 17a, being of greatly lesser diameter than that of face 17b, is of far lesser area, the areas varying as the square of the diameter, and a similar relationship exists with respect to faces 18a and 18b of valve member 18. By making the valve members 17 and 18 of the same size, there is presented to chamber A a large valve face 18b and a small valve face 17a, and to chamber B a large valve face 17b and a small valve face 18a.

With the valves closed and assuming chamber A to be the high pressure side, there is thus a greater total force acting upon valve 18 by its face 18b and acting to more tightly seat the valve than there is acting upon the face 17a of valve 17 in a direction to tend to unseat it. I thus make available a substantial force differential which I, in turn, put to work to oppose the forces tending to open valve 17 due to the higher pressure in chamber A.

An illustrative manner of accomplishing this is illustrated in Figure 7 where the two shafts 26 and 32 are provided, externally of the casing 10, with gears 75 and 76, respectively, in turn, geared together by an intermediate gear 77 rotatably mounted on a stud 78 carried in any suitable way by the casing 10. Any suitable means may be employed to drive the train of gearing as, for example, a hand crank 80 secured to gear 77, the crank 80 thus corresponding to crank 51 of Figure 3.

Or, of course, an electric motor drive, preferably reversible may also be provided as, for example, a motor 82, controlled as to starting and stopping and reversing in any suitable way, may be geared to the above-mentioned gear train as by a shaft 83 and a spur gear 84 meshing with the gear 77.

With such an arrangement, assuming the valves 17 and 18 to be initially in closed position as in Figure 1, the gear 77 may initially be turned to rotate the shafts 26 and 32, respectively, in clockwise and counterclockwise direction to an extent to move the valves 18 and 17 into completely open position; reverse rotation of the gear 77 achieves closure of the two valves. But when closed, assuming the high pressure side to be chamber A, the greater area of valve face 18b as compared to the much smaller area of valve face 17a causes a greater total force to be exerted on the valve 18 than is exerted on the valve 17, and through the connecting linkages of the valves to the shafts and the gear train connecting the two shafts 26 and 32; the difference in the two forces is exerted on the two valve faces, the excess being exerted against valve 18 is exerted through the just-described linkages and gearing to aid in holding valve 17 in closed position, and thus supplement the locking action achieved by the toggle mechanisms.

Such utilization of pressure differentials can be made to simplify the valve construction, for example, in the manner illustrated in Figure 9 in which the dividing wall 13 of the valve casing is for convenience offset or displaced as to its two halves, and valve members 17 and 18 are pivoted to swing in the same direction as by providing their respective hinges 19a and 20a at their adjacent ends.

On one of the valves, such as valve 18, is mounted or rigidly secured an arcuate arm 86 provided with a rack 87 that is part of an arc of circle whose center is coincident with the axis of hinge 20a. The vertical shaft 88 extends through the top wall of the casing 10, being provided with suitable bearings and internally of the casing it has a gear 89 which meshes with the rack 87 and externally it may be provided with a crank like the crank 80 of Figure 7 and with a driving gear like the gear 77 of Figure 7 to which may be geared the motor 82.

The rack arm 86 has an extension 86a to which is pivotally linked by a pin 90 a link 91 in turn pivotally connected as by a pin 92 to suitable lugs on the face 17a of the over valve 17.

Accordingly, both valves may be conjointly actuated by the shaft 88 and gear 89, into open or closed position. From the closed position as shown in Figure 9, counterclockwise rotation of gear 89 effects counterclockwise swinging of the valve 18, the drive of the gear being transmitted to swing the other valve 17 counterclockwise through the rack arm extension 86a and link 91. Reverse rotation of the gear 89 effects closure of the valves.

When in closed position, the pressure on the high side of the dividing wall or diaphragm 13 of the valve casing holds both valves closed. Assuming the chamber A to be the high pressure side, the greater area of valve face 18b has exerted thereagainst a greater force, in closing direction, than is exerted upon the smaller valve face 17a of valve 17 with the result that the latter force cannot effect opening of valve 17 for to do so it has to overcome, through the linkage 91 and arm 86 the larger force exerted against the larger valve face 18a of the valve 18.

If the chamber B is the high pressure side, the relationship of the different valve face areas is reversed in that now valve face 17b is greatly larger than the valve face 18a exposed to the pressure in chamber B and through the above-mentioned linkage, the lesser force exerted on valve face 18a cannot overcome the greater force exerted on valve face 17b and hence both valves remain locked in closed position by the pressure on the high pressure side thereof.

In either case, however, it will be noted that, to effect opening of the valves in the arrangements of Figures 7 and 9, only the above-mentioned pressure differential has to be overcome.

It will thus be seen that there has been provided in this invention a valve construction and a method of operating it and a control therefor by which the various objects hereinbefore set forth together with many thoroughly practical advantages are successfully achieved. It will be seen that the apparatus may be embodied in strong, dependable, compact and simple form and that it makes possible the actuation of the various valves with ease where manual operation is desired and with low power consumption where power drive or control is desired. It will be seen also that the construction is well adapted to meet the varying conditions of hard practical use.

As many possible embodiments may be made of the mechanical features of the above invention and as the art herein described might be varied in its various parts, steps, relation and order of each of the same to one or more of the others thereof, all without departing from the scope of the invention, it is to be understood that all matter hereinabove set forth, or shown in the accompanying drawings, is to be interpreted as illustrative and not in a limiting sense.

I claim:

1. A valve construction comprising a casing having therein an entry chamber and an exit chamber separated from each other by a transverse straight walled partition having at least two ports of substantially equal size therein with a valve member for each port, means mounting one of said valve members for movement into or out of port-closing position on the entry-chamber side of said partition so that pressure of fluid in said entry chamber opposes port-opening movement of the valve member, means mounting the other valve member for movement into or out of port-closing position on the exit-chamber side of said partition so that pressure of fluid in said entry chamber aids port-opening movement thereof, and means forming operating connections to said valve members causing movement of said valve members sequentially whereby movement of said other valve member, aided by fluid pressure, may be started in opening direction in advance of starting movement of said pressure-opposed valve member in opening direction.

2. A valve construction comprising a casing having therein an entry chamber and an exit chamber separated from each other by a transverse straight walled partition having at least two ports of substantially equal size therein with a valve member for each port, means mounting one of said valve members for movement into or out of port-closing position on the entry-chamber side of said partition so that pressure of fluid in said entry chamber opposes port-opening movement of the valve member, means mounting the other valve member for movement into or out of port-closing position on the exit-chamber side of said partition so that pressure of fluid in said entry chamber aids port-opening movement thereof, operating connections for effecting movement of said first valve member, operating connections for effecting movement of said second valve member, and mechanism causing actuation of said operating connections in the following sequence to effect flow from said entry chamber to said exit chamber, namely, to open said second valve member, then open said first valve member, and, for shutting off flow from said entry chamber to said exit chamber, to close said second valve member and then to close said first valve member.

3. A valve construction comprising a casing having therein an entry chamber and an exit chamber separated from each other by a transverse wall having at least two ports therein with a valve member for each port, means mounting one of said valve members for movement into or out of port-closing position on the entry-chamber side of said wall so that pressure of fluid in said entry chamber opposes port-opening movement of the valve member, means mounting the other valve member for movement into or out of port-closing position on the exit-chamber side of said wall so that pressure of fluid in said entry chamber aids port-opening movement thereof, means for locking said first valve member in port-closing position, means for locking said second valve member in port-closing position, and mechanism for moving said valve members and controlling said locking means, to effect flow from said entry chamber to said exit chamber, in the following sequence, namely, unlock the locking means for said second valve member and then move the latter in opening direction, aided by the fluid pressure acting thereon and thereby allow entry of fluid under pressure into said exit chamber to act upon the other side of said first valve member and diminish opposition by fluid in the entry chamber to opening movement of said first valve member, and unlock the locking means for said first valve member and then move the latter to open position, and, to cut off said flow, in the following sequence, namely, move said second valve member into closing position and actuating the locking means to lock it, and then move said first valve member into closing position and actuating its locking means to lock it closed.

4. A valve construction as claimed in claim 1 in which there is a manually-operable device constructed and operating upon said operating connections to cause said valve members to be actuated throughout a complete cycle that comprises opening said second valve member, then opening said first valve member, then closing said second valve member, and then closing said first valve member.

5. A valve construction comprising a casing, at least two valve means each comprising a port and valve, and having a straight walled partition in said casing into which said two valve ports are formed, said partition disposed within said casing for controlling the flow of a fluid and disposed transverse to such flow, with means movably mounting said two valves relative to their ports on opposite sides of said partition and in opposite directions relative to the direction of flow of fluid to be controlled, whereby the pressure of fluid can aid opening movement of one valve and oppose opening movement of the other, and means causing operation of said valves in a sequence of steps the complete cycle of which comprises opening said one valve, then opening said other valve, closing said one valve and then closing said other valve.

6. A valve construction comprising a casing, at least two valve means each comprising a port and valve, and having means for interposing said two valve ports in parallel in said casing for controlling the flow of a fluid, with means movably mounting said two valves relative to their ports and in opposite directions relative to the direction of flow of fluid to be controlled, whereby the pressure of fluid can aid opening movement of one valve and oppose opening movement of the other, driving means having a start and automatic stop control, mechanism driven by said driving means for actuating said valves in a complete cycle that comprises opening said one valve, then opening said other valve, then closing said one valve, and then closing said other valve, and means making said automatic stop effective to halt said cycle at a point where at least said other valve is open.

7. A valve construction comprising a casing, at least two valve means each comprising a port and valve, and having means for interposing said two valve ports in parallel in said casing for controlling the flow of a fluid, with means movably mounting said two valves relative to their ports and in opposite directions relative to the direction of flow of fluid to be controlled, whereby the pressure of fluid can aid opening movement of one valve and oppose opening movement of the other, driving means having a start and automatic stop control, mechanism driven by said driving means for actuating said valves in a complete cycle that comprises opening said one valve, then opening said other valve, then closing said one valve, and then closing said other valve, and means making said automatic stop effective to halt said cycle at a point where at least said other valve is open and for conditioning said start control to require a subsequent actuation thereof to effect drive of said mechanism for shutting off the flow of fluid, and means operative to make said automatic stop control effective upon the completion of said cycle when both of said valves are in closed position.

8. A valve construction comprising a casing, at least two valve means each comprising a port and valve, and having a straight walled partition in said casing into which said two valve ports are formed, said partition disposed within said casing for controlling the flow of a fluid and disposed transverse to such flow, with means movably mounting said two valves relative to their ports on opposite sides of said partition and in opposite directions relative to the direction of flow of fluid to be controlled, whereby the pressure of fluid can aid opening movement of one valve and oppose opening movement of the other, means for securing said one valve in closed position and against opening movement, and operating means capable of moving said valves and actuating said securing means in the following sequence, namely, actuate said securing means to release said one valve, open said one valve, open said other valve, close said one valve, and close said other valve.

9. A valve construction comprising a casing, at least two valve means each comprising a port and valve, and having means for interposing said two valve ports in parallel in said casing for controlling the flow of a fluid, with means movably mounting said two valves relative to their ports and in opposite directions relative to the direction of flow of fluid to be controlled, whereby the pressure of fluid can aid opening movement of one valve and oppose opening movement of the other, means for securing said one valve in closing position and hold it closed, means for securing said other valve in closed position and holding it closed, and means capable of moving said valves and actuating said securing means in a sequence that comprises actuating said securing means of said one valve, to release it, opening said one valve, actuating the securing means of said other valve to release it, opening said other valve, closing said one valve and then actuating its securing means to hold it closed, and then closing said other valve and actuating its securing means to hold it closed.

10. A valve construction as claimed in claim 1 in which said operating connections comprise actuating means, one for each valve, to effect movement thereof, and mechanism and control means therefor for operating said actuating means sequentially in a cycle which in its complete sequence comprises opening said second valve member, opening said first valve member, closing said second valve member and closing said first valve member, said control means including means whereby said complete sequence may be interrupted at a point where at least one of said valve members is open to thereby permit flow of fluid and, to stop flow of fluid, to complete said sequence to effect closing of both valve members.

11. A valve construction comprising a casing having therein an entry chamber and an exit chamber separated from each other by a transverse wall having at least two ports therein with a valve member for each port, means mounting one of said valve members for movement into or out of port-closing position on the entry-chamber side of said wall so that pressure of fluid in said entry chamber opposes port-opening movement of the valve member, means mounting the other valve member for movement into or out of port-closing position on the exit-chamber side of said wall so that pressure of fluid in said entry chamber aids port-opening movement thereof, said first valve member presenting a greater area to said entry chamber than does said second valve member, and operating connections for operating said valve members from the exterior of the casing into positions where at least one is in open position for flow of fluid and both are in closing position for stopping flow of fluid, said operating connections comprising also connections whereby the force differential acting upon said different areas when both valve members are in closed position operates upon said second valve member to hold it in closing position.

12. A valve construction comprising a casing, at least two valve means each comprising a port and valve, and having means for interposing said two valve ports in parallel in said casing for controlling the flow of a fluid, with means movably mounting said two valves relative to their ports and in opposite directions relative to the direction of flow of fluid to be controlled, whereby the pressure of fluid can aid opening movement of one valve and oppose opening movement of the other, toggle means, one for each valve, for actuating the valve into or out of closing position and for locking the valve in closed position, and means for operating said toggle means to operate said valves in a sequence of steps, the complete cycle of which comprises opening said one valve, opening said other valve, closing said one valve, and closing said other valve.

ARTHUR L. OCHELTREE.

REFERENCES CITED

The following references are of record in the file of this patent:

UNITED STATES PATENTS

| Number | Name | Date |
| --- | --- | --- |
| 151,580 | Eversol | June 2, 1874 |
| 288,331 | Haskell | Nov. 13, 1883 |
| 341,827 | Benham | May 11, 1886 |
| 476,550 | Pilet | June 7, 1892 |
| 616,100 | Harrison | Dec. 20, 1898 |
| 916,114 | Davis | Mar. 23, 1909 |
| 931,228 | Schutte | Aug. 17, 1909 |
| 1,280,713 | Goldenstein | Oct. 8, 1918 |
| 1,381,511 | Smith | June 14, 1921 |
| 1,989,942 | Parks | Feb. 5, 1935 |
| 2,274,776 | Cull | Mar. 3, 1942 |

FOREIGN PATENTS

| Number | Country | Date |
| --- | --- | --- |
| 13,006 | Great Britain | Sept. 8, 1888 |
| 342,192 | Great Britain | Jan. 29, 1931 |
| 455,795 | Great Britain | Oct. 28, 1936 |